310-369
SR
XR 3,218,636
X 87136
SEARCH ROOM
4

Nov. 16, 1965 J. M. BERNSTEIN ETAL 3,218,636

PIEZOELECTRIC SIGNALLING DEVICE

Filed Oct. 15, 1962 2 Sheets-Sheet 1

INVENTORS.
JOSEPH M. BERNSTEIN
NAOMI S. SULOWAY
BY
C. A. Gollmeaden
ATTY.

3218636
OR IN 340/392

Nov. 16, 1965 J. M. BERNSTEIN ETAL 3,218,636

PIEZOELECTRIC SIGNALLING DEVICE

Filed Oct. 15, 1962 2 Sheets-Sheet 2

INVENTORS.
JOSEPH M. BERNSTEIN
NAOMI S. SULOWAY
BY C. A. Gulbrandsen
ATTY.

3,218,636
Patented Nov. 16, 1965

3,218,636

PIEZOELECTRIC SIGNALLING DEVICE

Joseph M. Bernstein, Bensenville, and Naomi S. Suloway, Oak Park, Ill., assignors to Automatic Electric Laboratories, Inc., Northlake, Ill., a corporation of Delaware Filed Oct. 15, 1962, Ser. No. 231,322
3 Claims. (Cl. 340—392)

The invention relates to signalling devices and in particular to signalling devices employing a piezoelectric transducer.

Signalling devices are used to a great extent in telephone signalling systems. For example, signalling devices are used as attention-getting alarms in subscriber subsets. Usually the signalling device is an electro-dynamic ringer, that is, a device which employs an electromagnet, an armature-clapper arrangement and a bell or bells. Such ringers are relatively heavy and bulky. The construction of electro-dynamic ringers requires a number of parts. Also, such arrangements require a high level input and therefore have a relatively high power consumption.

It is an object of the invention to provide a novel and improved signalling arrangement which requires a relatively small amount of space.

It is a further object of the invention to provide a signalling arrangement having a low power consumption.

It is a still further object of the invention to provide a signalling device which requires only a few parts for its construction.

Other objects and the features of the invention will become apparent from the following description and the accompanying drawings.

Briefly, our invention relates to a signalling device employing a transducer having the characteristic of electrodiamorphosis that is inherent in certain ceramic materials. This property, the ability to change shape by means of an applied electric field, is employed to cause the vibration of the ceramic clapper between two bells. It should be noted that neither the geometry of the transducer nor its mode of vibration is the exclusive form by which the bells may be rung. In fact, ignoring the power requirements for such, either an electrostrictive material or a magnetostrictive material could be used for this purpose.

The apparatus for generating the ringing current can be located in the central office. In certain applications, it may be advantageous to incorporate a transistor oscillator into the signalling device within the subscriber subset. However, it would then be necessary to activate the oscillator by ringing currents.

In order to best understand the operation of the invention, we will first give a brief explanation of the drawings.

Figure 1:
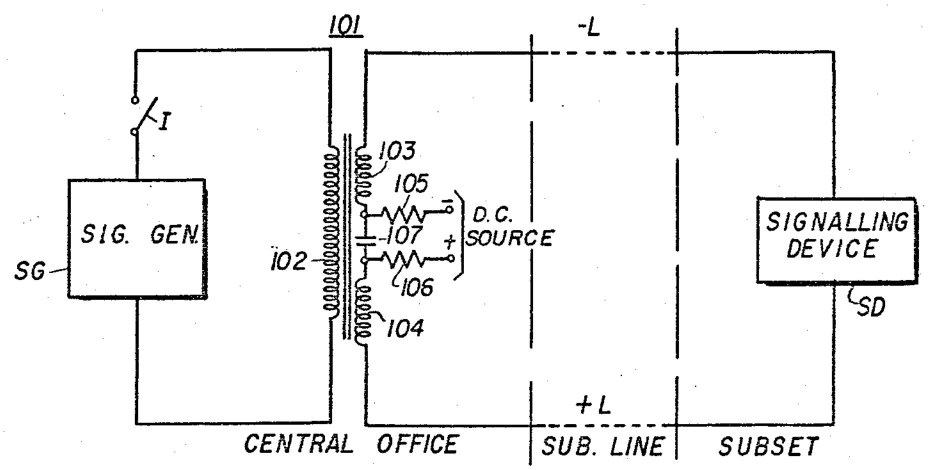
FIG. 1 is a schematic representation of a telephone signalling system in a form sufficient to show an environment of the invention.

Referring to FIG. 1, a signal generator SG, the output of which is interrupted by the interrupter I according to the ringing pattern, provides an alternating current signal to transformer 101 having windings 102, 103 and 104. The signals are then passed to the subscriber subset by way of the subscriber line +L and −L. The subscriber subset employs a signalling device SD which is responsive to the alternating current signal. The alternating current signal is to be of a frequency equal to the resonant frequency of the transducer.

Figure 2:
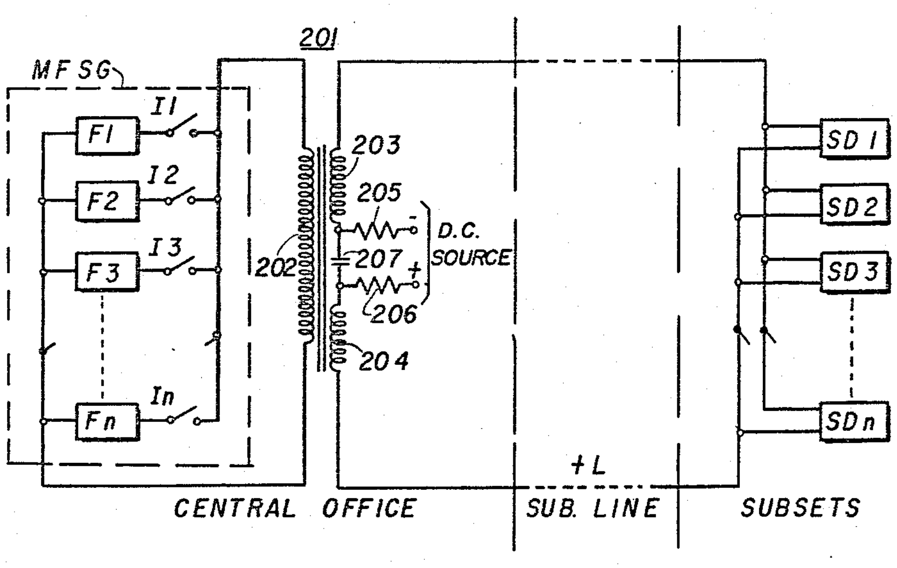
FIG. 2 is a schematic representation of a selective telephone signalling system having a plurality of signalling frequencies and a plurality of signalling devices.

Referring to FIG. 2, a multi-frequency signal generator MFSG having frequencies F1, F2, F3 . . . FN provides alternating current signals. The signals are transmitted by way of a subscriber line, in a manner similar to that of FIG. 1. A plurality of signalling devices SD1, SD2, SD3 . . . SDN are connected to the subscriber line. Each signalling device has a separate resonant frequency and is responsive to one of the frequencies of the multi-frequency signal generator MFSG. For example, signalling device SD2 will respond only to the frequency F2. Central office switching equipment (not shown) controls which frequency is transmitted. Switches 11 to I*n* are interrupters similar to I of FIG. 1.

In FIGS. 1 and 2 there is also a source of direct current and its associated resistances 105 and 106 or 205 and 206. The capacitances 107 and 207 are used to bypass the source of direct current.

Figure 3:
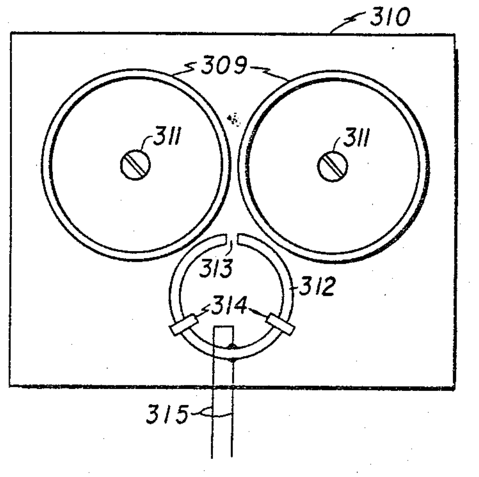
FIG. 3 is a mechanical drawing of an embodiment of the signalling device described herein.

Referring now to FIG. 3, two bells 309 are secured to a mounting base 310 by screws 311. The piezoelectric transducer 312 having a slot 313 is secured to the base 310 by the mounting clamp arrangements 314. Alternating current signals are supplied to the transducer by way of leads 315.

Figure 4:
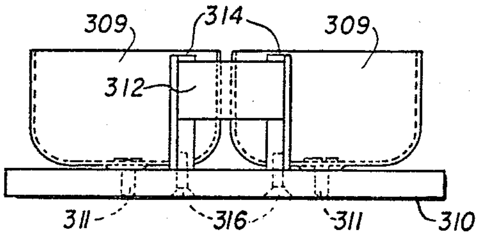
FIG. 4 is a mechanical drawing of a second view of the embodiment shown in FIG. 3.

Referring to FIG. 4, it can be seen that the same elements are present as shown in FIG. 3, however, it is further shown in this figure that the mounting clamps 314 are secured to the mounting base 310 by screws.

Figure 5A:
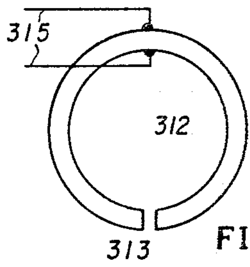
FIG. 5A is a drawing of the piezoelectric transducer of FIG. 3 in an unexcited state.
Figure 5B:
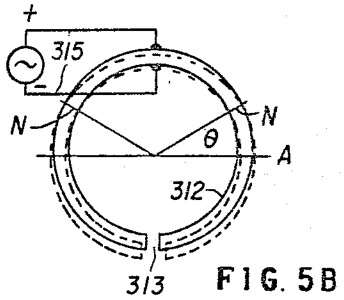
FIGS. 5B and 5C are drawings of the piezoelectric transducer shown in FIG. 3 in oppositely excited states.
Figure 5C:
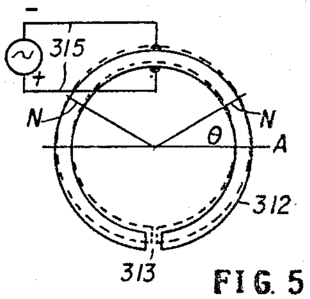

Referring to FIGS. 5A, 5B, and 5C, the piezoelectric transducer 312 having the split 313 and input leads 315 is shown in unexcited and excited states. In the latter two figures the ring is shown to be vibrating in a mode having two nodes N at an angle $\theta$ from the reference axis A. The physical displacement of the ring at points other than the nodal points is shown in phantom.

As previously explained, signalling devices have found great use in telephone signalling systems. Therefore, we will explain the operation of our novel signalling arrangement in connection with a telephone signalling system. This is for purpose of illustration only and should not limit the invention to the particular application described.

First assuming that our novel signalling device shown in FIG. 3 is connected in a signalling system, such as described by FIG. 1. The alternating current input signal is carried by leads 315 to the outer and inner surfaces of the transducer 312. The just-mentioned leads may advantageously be soldered to these surfaces. The inner and outer surfaces form electrodes which change polarity in accordance with the input alternating current signal. The ceramic material, because of the aforementioned property of electrodiamorphosis, will vibrate in response to the changing applied electric field, in a manner shown in FIGS. 5B and 5C.

The resonant frequency of the transducer is a function of the material and its dimensions. A model of our signalling device employed a ceramic ring having a 1.0″ outside diameter, 0.118″ wall thickness, and a 7/16″ height. The resonant frequency of this cylinder was 1560 c.p.s.

Assume now that several of our signalling devices, such as shown in FIG. 3 and each having a different resonant frequency, are connected to a signalling system, such as suggested by FIG. 2. Each device would therefore respond to a select one of the signals generated at the central office. For example, signalling device SD3 will respond only to frequency F3. It can easily be seen how selective ringing may be obtained in such a system employing the present invention.

An important advantage of our signalling device, as set forth as an object of the invention, is the relatively small amount of space it occupies. This is the result of substituting the ceramic transducer in place of coils, magnets, magnetic cores and armature-clapper arrangements. The elimination of the just-mentioned items also provides a light weight signalling device.

Another advantage over the electro-dynamic ringer, as also set forth as an object of the invention, is the low power requirement. This point is of special interest as it makes the device compatible with electronic systems.

While our device has been explained in the environment of a telephone system, we do not wish its use to be limited to that particular application.

Changes and modifications of our device may be made by one skilled in the art without departing from the spirit and scope of the invention and should be included in the appended claims.

What we claim is:

1. A signalling device for operation on alternating current comprising a piezoelectric vibratory means having the general shape of an annulus split at a point of its circumference, electrical connections to the inside and outside respectively, of said annulus to energize said vibrating means with said alternating current, and sound emitting means to be struck and mechanically activated by the energized vibratory means.

2. A signalling device for operation on alternating current, said device comprising: a base; gong means mounted on said base to produce acoustical energy when struck; and piezoelectric means mounted on said base in close proximity to said gong means, said piezoelectric means including electrical connections to receive said alternating current and thereby effect vibrations of said piezoelectric means to strike said gong means.

3. A signalling device for selective operation in response to a signal of a predetermined voice-frequency, said device comprising: a base; gong means mounted on said base to produce acoustical energy when struck; piezoelectric means mounted on said base in close proximity to said gong means and having a resonant frequency equal to said predetermined frequency, said piezoelectric means including electrical connections to receive said signal, and being energized by said signal to vibrate and strike said gong means.

References Cited by the Examiner

UNITED STATES PATENTS

| | | | |
|---|---|---|---|
| 2,498,990 | 2/1950 | Fryklund | 340—384 |
| 2,928,069 | 3/1960 | Peterman | 179—110 |
| 2,951,910 | 9/1960 | Bauman | 179—87 |
| 2,953,779 | 9/1960 | Brown | 179—84 |
| 3,004,177 | 10/1961 | Sobel et al. | 179—110 |
| 3,026,377 | 3/1962 | Sullivan | 179—17 |

ROBERT H. ROSE, *Primary Examiner.*

WALTER L. LYNDE, *Examiner.*